March 7, 1939.  L. M. WEEKS  2,149,823
JUNIOR SPEEDWAY
Original Filed Oct. 14, 1933  2 Sheets-Sheet 1
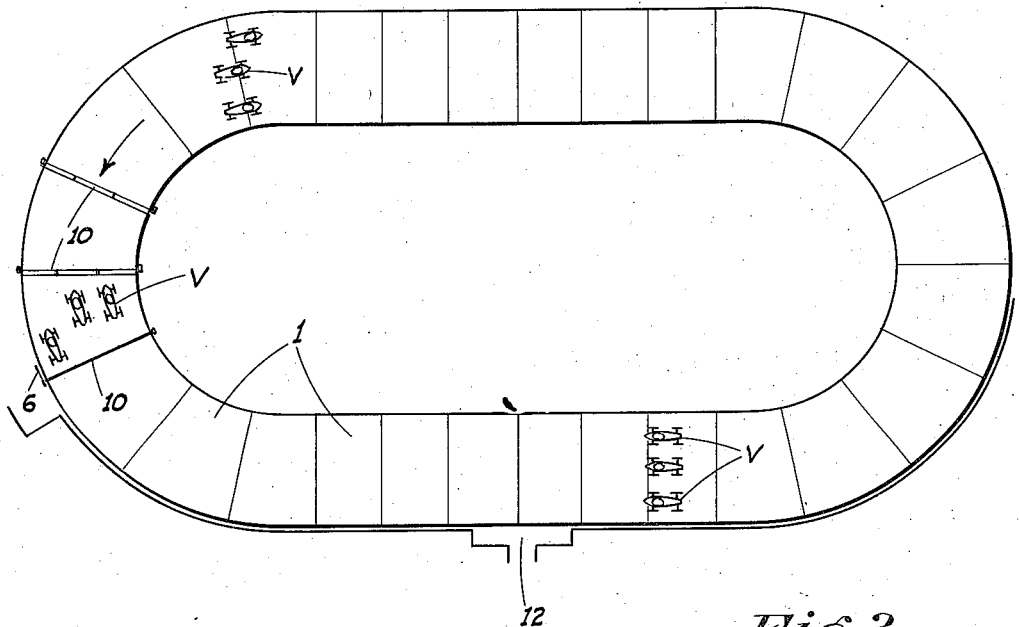
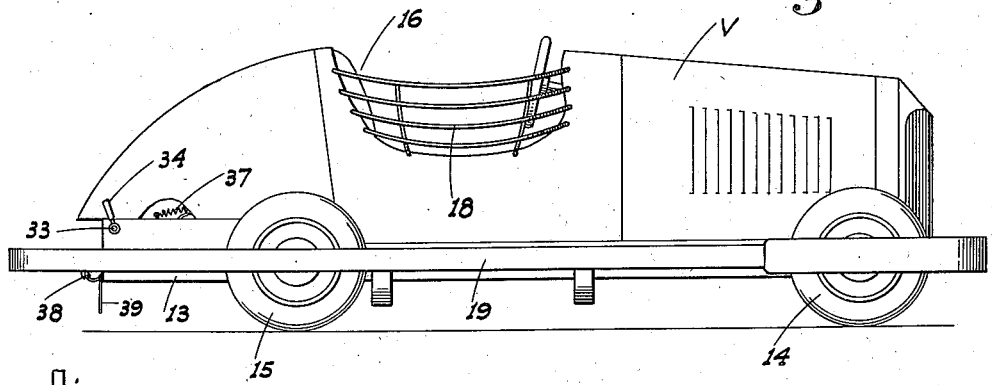
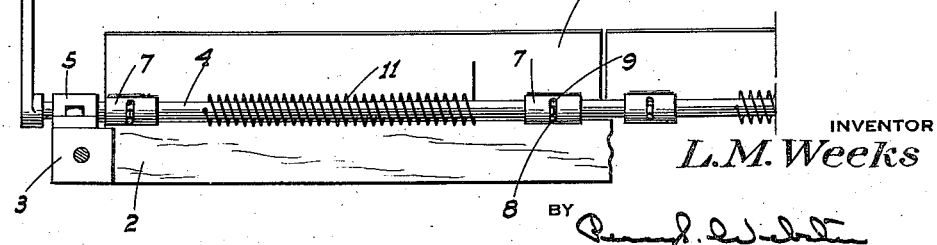
INVENTOR
L. M. Weeks
BY
ATTORNEY

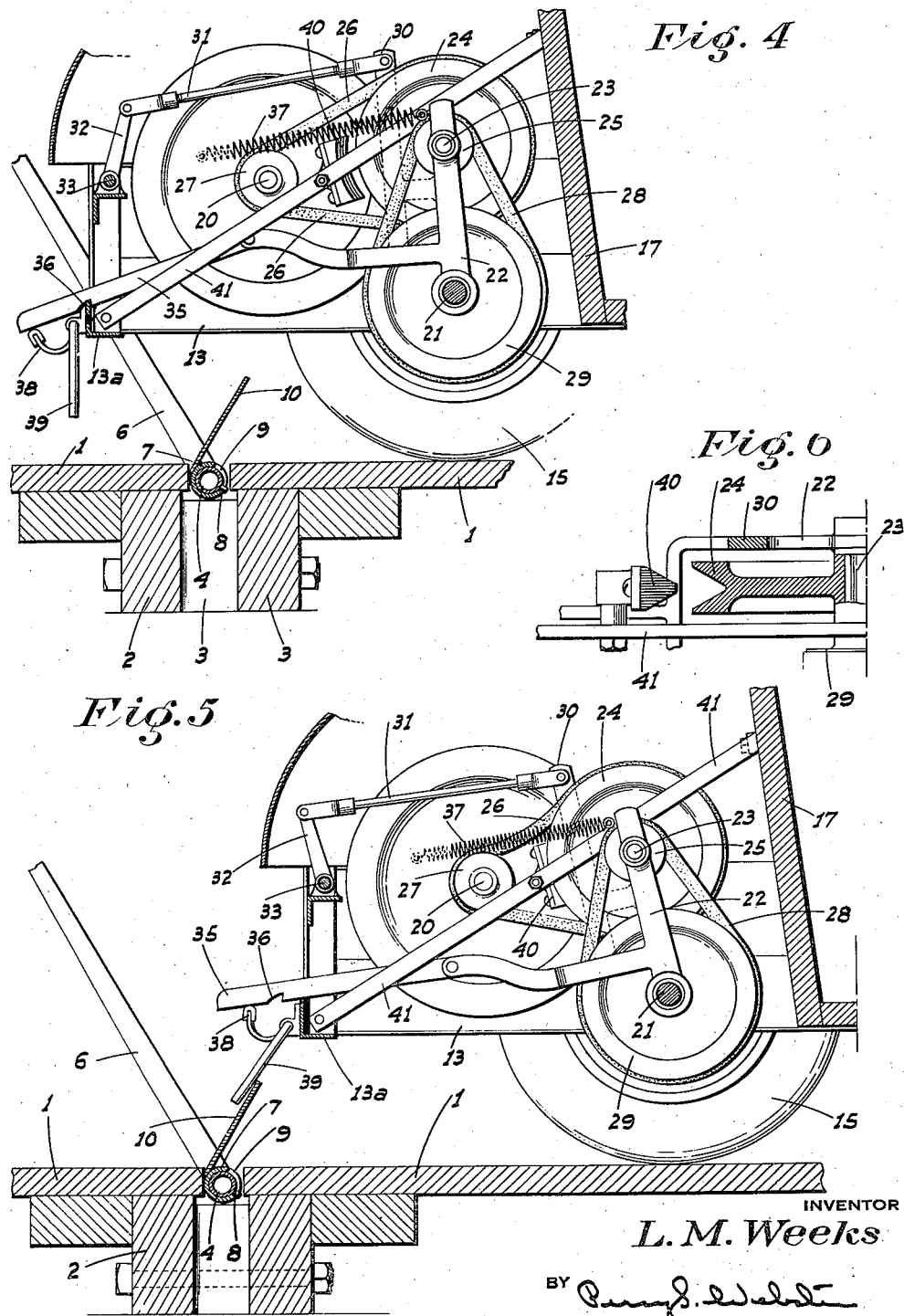

Patented Mar. 7, 1939

2,149,823

UNITED STATES PATENT OFFICE 2,149,823

JUNIOR SPEEDWAY

Leonard M. Weeks, Modesto, Calif.

Application October 14, 1933, Serial No. 693,621
Renewed February 12, 1937

3 Claims. (Cl. 104—60)

This invention relates to amusement devices for children and particularly to one especially intended and designed for use as a commercial concession in carnivals, fairs and other amusement parks.

The principal object of my invention is to provide a device of this general character which will give children the thrills of automobile racing with none of its dangers, and essentially comprises a speedway or endless track and real miniature-sized motor vehicles occupied and steered by the children themselves.

The vehicles are of a type especially designed for the purpose, being incapable of speeds such as would be dangerous to the occupants even if the vehicle should strike an obstruction. Also, the speed of the engine and of the vehicle is not under the control of the child so that the vehicle will only travel at that speed which has been determined by the designer as being safe.

The children are allowed so many turns around the track for a certain charge, and in order to facilitate the bringing of the vehicles to a halt after such number of turns has been made, I provide means operable at will by the attendant of the concession for breaking the driving engagement of the engine of the vehicles with their wheels from a point remote from such vehicles. At the same time brakes are automatically applied on the vehicles shortly bringing them to a stop, or they may be more quickly halted by the attendant grasping the same.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a plan view of the complete apparatus as in operation.

Fig. 2 is a side elevation of the preferred form of motor vehicle used on the speedway.

Fig. 3 is a side view of one of the vehicle stopping plates mounted on the speedway and shown in its operation position.

Fig. 4 is a fragmentary sectional elevation of the rear end of a vehicle as in operation, showing the stopping plate on the track in position to engage the trip rod on the vehicle with a certain further movement of the same.

Fig. 5 is a similar view showing the engine disengaged from the driving wheels of the vehicle by the action of the stopping place and trip rod.

Fig. 6 is a fragmentary plan view of the mechanism showing the brake structure.

Referring now more particularly to the characters of reference on the drawings, the track or speedway on which the vehicles travel is preferably formed of a number of separable track sections which when properly assembled form an endless track or speedway whose width is sufficient to admit a number of vehicles abreast. The sections at their ends removably rest on and are located by transversely extending longitudinally separated beams 2 which rest on the ground and which are bolted together to form a unit and held spaced by blocks 3 between said beams at their ends.

The adjacent ends of the flooring of certain sections are spaced from each other where they overlap the beams 2, as shown in Figs. 4 and 5 so as to leave room for the mounting of shaft members 4 therebetween. Each shaft extends the full width of the track and below the tops of the adjacent sections, being journaled in bearings 5 mounted on the blocks 3. An upstanding lever 6 is connected to said shaft at one end so that it may be turned at will.

Spaced sleeves 7 are turnable on the shaft being limited in their rotation by pins 8 projecting from said shaft and through circumferential slots 9 of a certain arcuate length in the sleeves. Plates 10 together extending the full width of the track are connected to and project tangentially from the sleeves, being so arranged that the plates may be turned down to lie flush on the flooring of an adjacent track section. Tension springs 11 about the shaft between the sleeves 7 of the various plates act independently on the plates to hold the pins at one end of the slots. This structure is mounted in connection with the track sections in such relation to the movement of the vehicles about the track as to position the plates so that if set upstanding any plate may fold down, either against the resistance of the spring or by turning the shaft, in the direction towards which the vehicles are traveling. It is to be understood that all the plates of each unit will be raised simultaneously by the operation of the lever 6. Each plate may however fold down independently of the others by the engagement of a vehicle wheel therewith.

I preferably employ three of these stop plate units which are mounted between adjacent track sections a certain distance ahead of the entrance and exit of the drivers or starting and stopping point 12 of the track. Each unit is complete in itself and independent of the others, and each has its own operating lever 6. This enables the plates to be successively manipulated to cause a corresponding number of sets of vehicles spaced along the track to be brought to a halt at different points from the stopping point.

In this manner if there are a number of sets of vehicles on the track simultaneously, with the vehicles of each set substantially abreast of each other, said sets may be successively halted so that they will not all pile up at the same point. Also, by the use of a number of plates on each unit (preferably the same number as there may be cars abreast on the track) the temporary folding of a plate by any car, as when the wheels engage and pass over the same, will not affect the other plates of the unit. In this manner, a set of cars all of which are substantially abreast will be stopped simultaneously if the plate unit is disposed by the attendant in its operative position.

The vehicles used on this track or speedway are of the same general type as shown in my copending application for patent, Serial No. 652,777, filed January 21, 1933, but have certain modifications thereover in order that they may cooperate with the track plates above described.

Such vehicles V each comprise essentially a frame 13 supported on steerable front wheels 14 and rear driving wheels 15. The body of the vehicle has an occupant cockpit 16 intermediate its ends, said cockpit having a bulkhead 17 at its back end so that the power plant which is behind said bulkhead cannot be handled or tampered with by the occupant. The sides of the cockpit which are cut down considerably are preferably provided with outwardly flaring guard rods 18 as a protection to the occupant. Also a flexible bumper strip 19 extends completely around the vehicle at spaced relation to and outwardly of the wheels to protect the same as well as the vehicle as a whole from being directly struck by another vehicle or by any other obstacle.

Supported on the frame 13 back of the bulkhead 17 is a small low-power gas engine having horizontal transversely extending drive shaft 20. The axle 21 of the rear wheels 15 turnably supports a vertical rock frame 22 in which is journaled, above the axle 21 and in front of the shaft 20, a countershaft 23. This shaft has transversely spaced large and small V-groove pulleys 24 and 25 respectively mounted as a unit thereon. A V-belt 26 engages the pulley 24 and a small pulley 27 on the engine shaft, while another V-belt 28 engages the pulley 25 and a larger pulley 29 fixed on the axle 21. The rotation of the engine is therefore transmitted to the axle at a greatly reduced speed as the belt 26 is non-slippingly engaged with its pulleys, which will only be the case under certain conditions, as will be seen.

Projecting upwardly from and rigid with the inner side of the frame 22, back of the pulley 24 as shown in Figure 6, is an arm 30 to which one end of a link 31 is attached. This link at its rear end is connected to an upstanding arm 32 fixed on a transverse shaft 33. The outer end of this shaft projects through one side of the body sheathing and at its outer end is provided with a handle 34 for manipulation from the outside. When the handle is pushed forwardly the frame 22 is advanced to cause the belt 26 to drivingly engage its pulleys as shown in Fig. 4. When the frame is in said position a flexibly mounted catch bar 35 projecting rearwardly from the frame above its lower end and having a notch 36 in its lower edge, then automatically engages the top edge of the cross frame member 13a of the vehicle, thus preventing the frame 22 from moving back and the belt 26 from becoming slack. A tension spring 37 between the top of the frame 22 and the adjacent side frame 13 tends to pull said frame 22 rearwardly against the resistance of the holding catch.

Pivoted at one end on the frame member 13a below the bar 35 is a trip arm 38 whose rear end is adapted to engage the under side of the adjacent end of said bar. A depending actuating rod 39 is mounted in connection with the arm 38, said rod hanging in the path of the trip plate 10 when the latter is upstanding.

In operation, to start the vehicle the handle 34 is thrown forward by the attendant to tighten the driving belt 26 on its pulleys, the notch 36 dropping over the frame 13a of itself to prevent retraction of the frame 22 as previously explained. The vehicle is then allowed to travel around the track as many times as desired or for a length of time which the operator of the concession considers to constitute a single ride. When the vehicle is thus traveling the various levers 6 are sunk so that the plates 10 lie flush with the track so that they do not affect the trip rod 39. When the required number of turns about the track has been made by any vehicle, the operator turns one of the levers 6 so as to place the corresponding plate 10 in an upstanding position so that it then lies in the path of the trip rod 39. The wheels of the vehicle of course engage the said plate first but they merely flatten the same down against the resistance of the spring 11, which restricts the plate to its upstanding position as soon as the wheels pass clear of the same.

When the plate 10 engages the rod 39 the latter is deflected rearwardly, as shown in Fig. 5, since the strength of the spring 11 is greater than the resistance of the trip rod and the catch arm 35. Said arm is therefore raised so that the notch 36 clears the frame member 13a, allowing the spring 37 to pull the rock frame 22 rearwardly and slacken the belt 26, as shown in Fig. 5. The vehicle being then disengaged from its engine will shortly come to a stop.

In addition to the driving belt being caused to run slack a brake is automatically applied in the following manner:

Disposed between the upper and lower runs of the belt 26 is a brake shoe 40 which is shaped to enter and follow the contour of the groove of the pulley 24 as shown in Fig. 6. This shoe is anchored in connection with and to one side of a rigid longitudinally extending bar 41 which is fixed at one end on the frame of the vehicle and in the other end on the bulkhead 17. The shoe is positioned so that when the spring 37 is free to act and the frame 22 is pulled rearwardly, said pulley 24 is brought into frictional braking engagement with the shoe, the pressure of the braking application of course depending on the strength of the spring. When the frame 22 and the pulley 24 are advanced, the stationary shoe is of course withdrawn from braking engagement with the pulley so that there is no possible wear on the brake shoe except when it is positively engaged with the pulley in braking relation.

It will be realized that the driving belt and its pulleys form in effect a friction clutch and it has so been considered in the claims.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In combination, a motor vehicle, a track on which the vehicle is adapted to travel, an engine on the vehicle, a disengageable drive connection between the engine and the drive wheels of the vehicle, means tending to disengage said connection, means to hold the connection engaged in opposition to the disengaging means and including a catch bar, a rearwardly swingable trip rod mounted on and depending from the vehicle, means between said rod and bar to release the latter when the rod is swung rearwardly, and means mounted on the track to project into the path of the rod with the forward movement of the vehicle to engage and cause the rod to be swung rearwardly whereby to release said driving connection.

2. A structure as in claim 1, in which said last named means comprises a plate extending across the track, means pivoting said plate adjacent track level, and manual means to swing the plate up or down about its pivot.

3. A junior speedway comprising a driving track, a motor vehicle adapted to be driven along the track, a normally engaged driving clutch on the vehicle, a depending element on the vehicle movable to disengage the clutch, a plate extending across the track, and adapted when in upstanding position to engage the element, means pivoting said plate adjacent track level, means to swing the plate up or down about its pivot, and means included with the plate mounting means whereby the plate will be turned down by engagement with the wheels of the vehicle but will return to an upstanding position after the wheels have passed over the plate.

LEONARD M. WEEKS.